United States Patent [19]

Gagné et al.

[11] Patent Number: 4,475,994
[45] Date of Patent: Oct. 9, 1984

[54] METHOD AND APPARATUS FOR SEPARATING OXYGEN FROM A GASEOUS MIXTURE

[75] Inventors: Robert R. Gagné, Pasadena; Matthew L. Marrocco, III, Santa Ana, both of Calif.

[73] Assignee: Maxdem Incorporated, Pasadena, Calif.

[21] Appl. No.: 565,921

[22] Filed: Dec. 27, 1983

[51] Int. Cl.$^3$ .............................................. C25B 1/04
[52] U.S. Cl. .................................... 204/129; 204/130; 204/250; 204/265; 204/266; 204/277; 204/278; 204/258
[58] Field of Search ............... 204/130, 129, 251, 258, 204/265, 266, 250, 277, 278, 282, 283

[56] References Cited

U.S. PATENT DOCUMENTS 3,692,649  9/1972  Prigent et al. ....................... 204/130
4,246,081  1/1981  Winnich ............................... 204/130

Primary Examiner—R. L. Andrews
Attorney, Agent, or Firm—Christie, Parker & Hale

[57] ABSTRACT

A process and apparatus is provided for separating oxygen from a mixture of gases such as air. The apparatus includes an electrochemical cell that includes a cathode, an anode and an electrolyte. Oxygen in the air is reduced to the superoxide ion ($O_2^-$) at the cathode; the superoxide ion is transported across the cell through the electrolyte; and the superoxide ion is then reoxidized to oxygen at the anode and collected.

31 Claims, 1 Drawing Figure

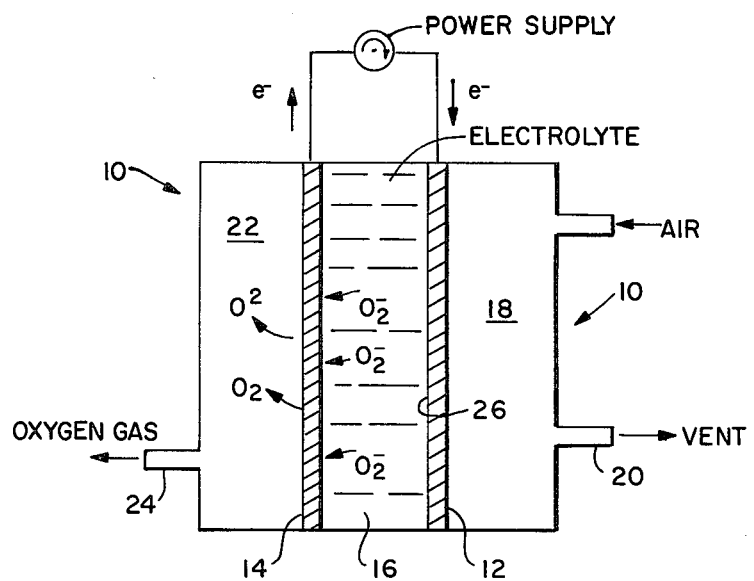

METHOD AND APPARATUS FOR SEPARATING OXYGEN FROM A GASEOUS MIXTURE

FIELD OF THE INVENTION

This invention relates to a process and apparatus useful for separating oxygen from a mixture of gases by reducing the oxygen to its superoxide ion ($O_2^-$), transporting the superoxide ion from the reducing environment to an oxidizing environment and reoxidizing the superoxide ion to oxygen. More particularly, this invention relates to a process for separating oxygen from air in an electrochemical cell, wherein oxygen is reduced to the superoxide ion at the cathode; the superoxide ion is transported across the cell through an electrolyte; and the superoxide ion is reoxidized to oxygen at the anode.

BACKGROUND OF THE INVENTION

Oxygen gas has many uses. For example, it can be used for treatment of patients in the medical field, for various industrial processes, and for breathing in an environment in which oxygen is deficient. As a result of the variety of uses for oxygen gas, there is currently a substantial demand for such gas and also for a process by which it can be produced economically, efficiently and safely. Preferably such a process can be carried out in relatively large units and also in relatively small units, e.g. portable units.

One process that is presently used to produce oxygen gas is electrolysis of water. There are, however, several problems associated with electrolysis that make it unattractive. For example, electrolysis requires a large consumption of electrical energy and the oxygen gas produced can contain small amounts of hydrogen gas which must be removed before the oxygen can be used. Additionally the concomitant production of hydrogen along with oxygen during electrolysis presents serious safety hazards.

In addition to electrolysis of water, processes are available in the art for producing pure oxygen gas by separating oxygen from a gaseous mixture such as air. The most widely used oxygen separation process is cryogenic liquifaction and distillation of air. Such cryogenic processes have several drawbacks, however; they are energy intensive with overall efficiencies of less than about 35-40 percent and they must be run in plants whose capacities exceed about 100 tons per day to take advantage of economy of scale. Because cryogenic units must be quite large to be economically feasible, smaller and/or portable units based on this technology are not available. Therefore, when a cryogenic process is used, the resulting oxygen usually must be shipped from a large central production facility to the end user. In this case the product oxygen is often transported as a liquid in expensive vehicles equipped with cryogenic dewars. The cost of the cryogenic process is further increased since the transport and storage of liquid oxygen is hazardous and thus, special precautions must be taken.

In addition to the above described cryogenic processes, oxygen can be separated from air by means of known electrochemical processes which are based either on a two-electron reduction of oxygen or a four-electron reduction. For example, U.S. Pat. No. 3,888,749 to Chong, U.S. Pat. No. 4,061,554 to Chillier-Duchatel et al and U.S. Pat. No. 4,300,987 to Tseung et al, disclose electrochemical processes for separating oxygen from air by means of a two-electron transfer. U.S. Pat. No. 3,410,783 to Tomter discloses electrochemical processes for separating oxygen from air by means of either two- or four-electron transfers.

Since the electrical current which must be passed through an electrolyte in an electrolytic cell for separating a given amount of oxygen from a gaseous mixture is directly proportional to the number of electrons (n) that reduces each molecule of oxygen, a four-electron process requires twice the amount of current that is required by a two-electron process. For perfectly reversible (ideal) electrochemical cells the voltage is fixed by the thermodynamic relationship:

$$\Delta G = -nFE \qquad (1)$$

where $\Delta G$ is the free energy change, n is the number of electrons transferred per mole of material passing through the cell, F is the Farady (1F=96,490 Coulombs) and E is the reversible, equilibrium cell voltage. For the separation of oxygen from air $\Delta G$ is fixed and is independent of the method of separation. Since $\Delta G$ is fixed in the ideal case, the energy efficiency is 100% regardless of the value of n because the voltage varies to compensate for n. Consider, for example, two ideal cells, A and B, with n equal to 4 and 2 respectively, where both cells operate with a $\Delta G$ of 9.6 kilojoules/mole (kj/mole). The total amount of power required to electrolyze 1 millimole/second (mmol/s) of material in cells A and B is listed below in Table I.

TABLE I

| Cell | n | Voltage | Amps(I) | Power-Watts (P = E × I) |
|------|---|---------|---------|--------------------------|
| A    | 4 | 0.025   | 384     | 9.6                      |
| B    | 2 | 0.05    | 192     | 9.6                      |

Although, as is shown above for ideal cells, while cell A must pass 384 amps and cell B must pass 192 amps to electrolyze 1 mmol of material per second, the total power required is the same for both cells.

Any real situation is somewhat different however because of unavoidable cell resistances and irreversibilities which prevent 100% efficiency. Thus, as is described below in greater detail, when oxygen is separated from air in an actual (non-ideal) electrochemical cell, the cell with a lower n value will be more efficient.

For example, in the non-ideal cell the total power is defined by equation (2) below:

$$P = E(\text{faradaic}) \times I + I^2 R(\text{ohmic}) \qquad (2)$$

Since the four-electron process (n=4) must pass 2 times as much current as the two-electron process (n=2) to produce a given amount of product in a given amount of time, the ohmic term for the four-electron process will be four times as large as for the two-electron process.

Thus, when equation (2) is applied to the example set forth above and an actual cell resistance of 0.001 ohms is assumed, the power requirement to produce 1 mmol/sec of material in cell A is 157 j/mmole while the power requirement is only 46.5 j/mmole in cell B.

In the foregoing discussion it was assumed that equal amounts of product were produced during equal time periods in cells with the same resistance. In practice, it is possible to lower the cell resistance by increasing the area of the electrodes. For example, by allowing cell A to have four times the electrode area as cell B, and assuming the resistance of cell A is consequently lowered four-fold, the energy requirements for the two cells (cells A and B) will be the same. Thus, under conditions of equal energy requirements the cell with a lower n value has an advantage in cell size. Since the cost of electrochemical cells scales roughly with electrode surface area the advantage of providing a cell using a relatively lower n can be substantial.

A person skilled in the art can design a cell in such a way that electrode area, current density, voltage, product output and rate are optimized to suit a particular need. In general the cell with smaller n value will have an advantage in one or more of these parameters.

SUMMARY OF THE INVENTION

This invention relates to a process in which an electrochemical cell provided in accordance with this invention is used for separating oxygen from air or other gaseous mixture.

In one embodiment, the process of this invention comprises the steps of contacting the cathode of the electrochemical cell with a gaseous mixture comprising oxygen to thereby reduce oxygen by a single electron to its superoxide ion. Such superoxide ions are transported across the cell from the cathode to the anode through the electrolyte contained therein. The superoxide ions are oxidized to oxygen at the anode where the oxygen is discharged as oxygen gas.

In a second embodiment, the process of this invention comprises the steps of adding a transition metal complex to the electrolyte contained in the electrochemical cell. Such a transition metal complex that is provided in accordance with this invention can be reduced at a potential more positive than oxygen reduction. A potential is then applied across the cell to reduce the transition metal complex by a single electron at the cathode to form a complex capable of reversibly binding oxygen. A gaseous mixture comprising oxygen is introduced into the electrochemical cell to contact the reduced transition metal complex so that oxygen is bound to the complex. The oxygen-containing complex is transported to the anode where the complex is reoxidized by a single electron at which time said complex releases the bound oxygen for recovery.

In both of the above described embodiments of the process of this invention, oxygen is separated from air by means of a single electron transfer.

The electrochemical cells provided in accordance with this invention comprise an anode, a cathode and an electrolyte. In one embodiment the electrolyte is an aqueous electrolyte and the cathode has a coating thereon and is provided to reduce oxygen to its superoxide ion. The coating is relatively impermeable to water while being relatively permeable to the superoxide ion. The aqueous electrolyte has a pH greater than about 7 and provides the means for transporting such superoxide ions across the cell from the cathode to the anode where the superoxide ions are reoxidized to oxygen and collected.

In another embodiment of the electrochemical cell provided in accordance with this invention, the electrolyte comprises an aprotic solvent containing a dissolved salt.

In yet another embodiment of the electrochemical cell provided in accordance with this invention, the electrolyte is a solid polymer electrolyte.

DRAWING

These and other features, aspects and advantages of the present invention will be more fully understood when considered with respect to the following detailed description, appended claims and the accompanying drawing which is a schematic of one exemplary embodiment of an electrochemical cell provided in accordance with practice of principles of this invention for separating oxygen from air by means of a one electron transfer.

DETAILED DESCRIPTION

Although the process and apparatus provided in accordance with practice of principles of this invention are both described below with reference to the schematic electrochemical cell 10 shown in the drawing, it should be understood that the components of the electrochemical cell comprising this invention can be provided in various configurations as are well known in the art of cell design. Furthermore, although this invention is discussed in terms of only a single electrochemical cell, the apparatus provided in accordance with this invention can include a plurality of such cells.

The electrochemical cell 10 of this invention includes a cathode 12, an anode 14 and an electrolyte 16 extending between the cathode and anode. Briefly, in accordance with the process of this invention, the cell 10 is operated to separate oxygen from air (or from another gaseous mixture comprising oxygen) by impressing an appropriate potential across the anode and cathode and by introducing air into a chamber 18 in fluid communication with the cathode. The air contacts the cathode surface where oxygen in the air is reduced by one electron to its superoxide ion ($O_2^-$). (Excess air is vented from the chamber 18 via a vent 20 or the like.) The superoxide ions produced at the cathode migrate into the electrolyte and travel through the electrolyte under the influence of diffusion, convection and electromigration to the anode where such ions are reoxidized (by one electron) to oxygen. Oxygen is liberated from the anode as oxygen gas and is collected in an oxygen chamber 22 from which it is withdrawn for use through a vent, such as the vent 24.

The overall process of this invention is shown as the sum of two half cells by equations 3 and 4 below:

$$O_2 + 1e^- \rightarrow O_2^- \text{(cathode); and} \quad (3)$$

$$O_2^- \rightarrow O_2 \uparrow + 1e^- \text{(anode)} \quad (4)$$

As is described below in greater detail, a key feature of the process and apparatus of this invention is the transport of the superoxide ions from the cathode, where they are formed, through the electrolyte to the anode for reoxidation to oxygen, without a significant number of such superoxide ions being reduced further to peroxide. Thus, the apparatus and process of this invention provide for oxygen to be separated from air by means of a single electron transfer instead of the two- or four-electron transfers known previously in the art.

This invention is unique in that it can result in higher efficiencies than were previously achievable with electro separation cells i.e., electrochemical cells, based on two- or four-electron transfers. It is also unique in that no expensive electro catalysts are required for either the anode or cathode. Further, since the superoxide ion is not a strong oxidant, it does not oxidatively attack the electrodes or other cell components as does the peroxide ion used in prior art processes. Additionally, the potentials required at the electrodes of the instant invention are more reducing than the normal hydrogen electrode (NHE), whereas in the two- and four-electron processes the electrodes are set at more positive potentials. Because the required potentials are lower, the electrodes in the one-electron process of this invention are not exposed to as harsh an environment as in the two- and four-electron processes and thus, are less subject to oxidative degradation.

Electrodes contemplated for use in accordance with practice of this invention can be carbon in the form of graphite, vitreous or glassy carbon, carbonblack, carbonized cloth, carbon fibers or other forms of carbon known in the art. Alternatively, the electrodes can be non-noble metals, e.g. mercury or lead, conducting inert borides, carbides, nitrides, silicides, phosphides, and sulfides or noble metals, e.g. platinum or gold.

If desired, the cathode can be in the form of a gas diffusion electrode to increase the electrode surface available for contacting the air and thus, the oxygen contained in the air. The particulars of construction of such gas diffusion electrodes are well known to those skilled in the art and do not provide any part of the instant invention.

As is described in greater detail below, the electrolytes contemplated for use in accordance with practice of this invention can be aqueous electrolytes, non-aqueous electrolytes or mixtures thereof.

As was mentioned previously, key features of this invention are the reduction of oxygen in air to the superoxide ion at the cathode and inhibiting the superoxide ion from being reduced further to peroxide as it travels from the cathode to the anode through the electrolyte.

In one embodiment of the cell 10 of this invention, an aqueous electrolyte is provided and the cathode includes a coating 26 (shown schematically in the drawing) that is relatively impermeable to water while being relatively permeable to the superoxide ion.

If an aqueous electrolyte is used and no such coating is provided, peroxide is formed at the cathode, i.e., it is thought that the superoxide ion originally formed at the cathode is reduced further on the cathode surface to peroxide. A discussion of this reaction and of coating a mercury electrode with quinoline to prevent peroxide formation can be found in J. Chevalet et al, ELECTROGENERATION AND SOME PROPERTIES OF THE SUPEROXIDE ION IN AQUEOUS SOLUTIONS, J. Electroanal. Chem., 39(1972), which is incorporated herein by this reference.

In accordance with practice of this invention such cathode coatings can be provided by adding a compound (hereinafter referred to as a surfactant) to the electrolyte which is capable of being adsorbed from the electrolyte onto the cathode surface. When such a surfactant is used it is desired, although not necessary, that the aqueous electrolyte is saturated with the surfactant. Alternatively, if desired, the coating can be a polymer applied directly to the cathode surface. Non-limiting examples of surfactants comtemplated for use in accordance with this invention include quinoline, triphenylphosphine oxide, pyridine and substituted pyridines, substituted quinolines, trialkyl amines, thiols and thioethers, cetyltrialkylammonium salts, benzyltrialkylammonium salts and other cationic surfactants, sodium lauryl sulfate, alkyl sulfates and sulfonates, alkyl phosphates and phosphonates and other anionic surfactants, polyethelyene glycols, polypropylene glycols, and other non-ionic surfactants.

Non-limiting examples of polymers that are contemplated for use in coating the cathode are polyvinylpyridine, polyacrylonitrile, polyacrylamide, and their copolymers.

Once the superoxide ion is formed on the cathode and migrates through the cathode coating (which is permeable to the superoxide ion) into the aqueous electrolyte it is inhibited from being further reduced to peroxide in accordance with practice of this invention by providing that the electrolyte has a pH greater than 10 and preferably greater than 12. For example, having a relatively high pH reduces the probability that the superoxide ions will react with protons and undergo disproportionation according to the following reaction:

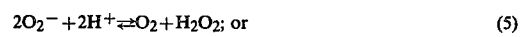
$$2O_2^- + 2H^+ \rightleftharpoons O_2 + H_2O_2; \text{ or} \tag{5}$$

$$2O_2^- + H_2O \rightleftharpoons O_2 + HO_2^- + OH^- \tag{6}$$

Thus, by providing an aqueous electrolyte solution with a pH greater than 10 and preferably greater than 12, the superoxide ions which are produced at the coated cathode travel through the electrolyte to the anode where they are reoxidized by a single electron transfer to oxygen. The oxygen gas liberated at the anode is then collected for use.

In addition to the above described technique of maintaining the aqueous electrolyte at a relatively high pH to stabilize the superoxide ion, further stabilization can be provided in accordance with this invention by adding one or more nitriles to the electrolyte. Non-limiting examples of nitriles contemplated for use in accordance with practice of this invention include benzonitrile, propionitrile, butyronitrile, malononitrile, succinonitrile, adiponitrile, cyanoacetate, 2-cyanoethyl ether, the cyanopyridines, polyacrylonitrile and acrylonitrile copolymers, polycyanoacrylate and cyanoacrylate copolymers.

Preferably such nitriles are added to the electrolyte in an amount to provide at least about 1% by weight of the nitrile to the total weight of the electrolyte solution.

In addition to adding a nitrile to the aqueous electrolyte to stabilize the superoxide ion, or as an alternative to such nitrile addition, it is thought that Lewis acids can be added to such an aqueous electrolyte for stabilizing the superoxide ion. For example, it is thought that the superoxide ion will associate with cations, especially multivalent cations such as $Ca^{++}$, $Ba^{++}$, $Zn^{++}$ and $Al^{+++}$, making the superoxide ion less susceptible to disproportionation. Preferably such Lewis acids are added to the electrolyte in an amount sufficient to provide at least about a 0.01 molar (M) solution.

In addition to the foregoing techniques for stabilizing the superoxide ion in aqueous electrolytes or, as an alternative thereto, the superoxide ion can be stabilized by adding organic cations such as tetraalkylammonium, alkylpyridinium, phosphonium, cetyltrialkylammonium, alkyltriethanolamine, and quaternized polyvinylpyridines or polyethyleneimines to the electrolyte. Preferably, such organic cations are added to the electrolyte in an amount sufficient to provide at least about a 0.1 molar solution.

Alternatively or in addition to the foregoing, the superoxide ion can be stabilized in an aqueous electrolyte in accordance with this invention by adding to the electrolyte certain macromolecules such as, for example, the crowns and cryptands. Preferably, such crowns and cryptands are anion binding crowns and cryptands and are added to the electrolyte in an amount sufficient to provide at least about a 0.01 molar solution.

Some transition metals, e.g. iron and copper, are known to catalyze the disproportionation of the superoxide ion in aqueous electrolytes. Since however, it is also known that certain ligands will act to suppress superoxide ion disproportionation by such transition metal ions, it is contemplated, in accordance with this invention, that when an aqueous electrolyte is used, various ligands can be added to the electrolyte to increase the stability of the superoxide ion. Ligands contemplated for such use include, for example, ethylenediaminetetraacetate, nitrilotriacetate, triphosphate and ethylenediamine and the like.

The amount of such ligands desired to be added to the electrolyte can be determined by one skilled in the art based on the amount of contaminants, such as iron and/or copper, present in the electrolyte.

Non-limiting examples of aqueous electrolytes contemplated for use in accordance with this invention include alkali hydroxides (LiOH, NaOH, KOH, RbOH, CsOH), alkaline earth hydroxides ($Mg(OH)_2$, $Ca(OH)_2$, $Ba(OH)_2$), alkali silicates, alkali borates, alkali and alkaline earth phosphates, alkali sulfates, alkali and alkaline earth halides or combinations and mixtures of the above.

When an aqueous electrolyte is included in the electrochemical cell provided in accordance with this invention it is preferred that the process of this invention includes the step of removing carbon dioxide from the inlet air. Such carbon dioxide removal prevents precipitation of carbonates and is particularly important when the nature of the electrolyte would result in precipitation of insoluble carbonates.

As was mentioned above, in another embodiment of this invention the electrolytic cell 10 includes non-aqueous electrolyte. Such non-aqueous electrolytes contemplated for use in accordance with practice of this invention are high-boiling (b.p. greater than about 100° F.), aprotic polar solvents that contain an inert salt which dissolves to form at least a 0.1 molar solution. Preferably such solvents are selected from those that have little or no toxicity, especially when the product oxygen gas is intended for medical use.

Aprotic high-boiling solvents contemplated for use in accordance with this invention include, but are not limited to: pyridine, N,N-dimethylformamide, N,N-dimethylacetamide, acetonitrile, benzonitrile, quinoline, substituted pyridines, non-limiting examples of which are methylpyridine, t-butylpyridine, di-t-butylpyridine, tri-t-butylpyridine, N-methylpyridinium salts, N-ethylpyridinium salts, and pyridinecarboxamides, also N-methylpyrrolidinone, dipyridylether, butyronitrile, propionitrile, adiponitrile, chlorocarbons, fluorocarbons and chlorofluorocarbons, perfluorinated amines and perfluorinated ethers.

Salts that are contemplated for use in combination with the aprotic solvents to provide the electrolyte of this invention include, but are not limited to: tetraalkylammonium halides, where the alkyl groups are preferably hydrocarbons having 1 to 16 carbon atoms, preferably tetramethyl ammonium chloride, methylpyridinium halides, ethylpyridinium halides, tetraalkylammonium sulfates, perchlorates, acetates and trifluoroacetates, where the alkyl group is a straight chain hydrocarbon preferably having a length of 1 to 4 carbon atoms, alkali metal acetates and trifluoroacetates.

When an aprotic solvent electrolyte system is included in the electrochemical cell of this invention, no coating is required on the cathode because no protons are available to catalyze further reduction of the superoxide ion formed on the cathode. However, to maintain the aprotic solvent free of protons, i.e., to maintain the solvent free of water, the inlet air is preferably dried in a drying step before it is introduced into the cell. Alternatively, or in addition to drying the air before it is introduced into the cell, a drying agent such as molecular sieves or activated silica can be added directly to the aprotic solvent electrolyte.

Another feature of the present invention is based on the reactions of certain transition metal complexes, especially of cobalt, which can bind superoxide ions reversibly in accordance with the following one-electron transfer reactions:

(7)

and;

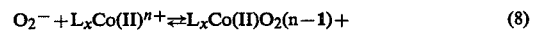

(8)

where L designates a ligand, x designates the number of such ligands associated with a cobalt ion, n is the total charge of the complex, and II and III represent the cobalt ion valance.

In accordance with practice of this invention, if desired, such transition metal complexes can be added either to the above-described aqueous or non-aqueous electrolytes comprising the electrochemical cell of this invention to further stabilize the superoxide ions. Because the binding of such a superoxide ion by the transition metal complex is reversible, the complex can act to increase the "effective concentration" of the superoxide ion in solution. Said another way, the total concentration of bound and unbound superoxide ion in the electrolyte can be greater than the concentration of superoxide ion that can be obtained with only unbound superoxide when such a complex is not used. Having a higher superoxide ion concentration can result in higher current densities and smaller electrode surface areas thereby increasing the efficiency of the process.

When one or more transition metal complexes are used, oxygen is reduced to its superoxide ion at the cathode and both free and bound superoxide ions, the relative amounts of which are determined by the binding constant of the complex, are transported across the cell to the anode where the free superoxide is oxidized to oxygen. Additionally the superoxide bound to the complex is released at the anode and is oxidized to oxygen. The complex, free of the superoxide ion, then returns to the cathode to pick up superoxide ions being newly formed.

Preferably, such transition metal complexes are added to the electrolyte in an amount sufficient to provide at least a 0.01 molar solution. More preferably at least a 0.1 molar solution is provided.

In another exemplary embodiment of practice of principles of this invention, a redox active transition metal complex can be added to the aqueous or non-aqueous electrolyte 16 of the cell 10 of this invention. Although such use of redox active transition metal complexes results in a different mechanism for separating oxygen from air than was described previously, both mechanisms accomplish oxygen separation by means of a one-electron transfer. For example, when cobalt transition metal complexes are used, if the characteristics of the ligand are such that Co(III) is reduced to Co(II) at potentials more positive than oxygen reduction, the reaction at the cathode will be the production of Co(II). The Co(II) complex will then bind the oxygen from the air and the bound oxygen will be transported across the cell to the anode on the Co(II) complex. Because the binding is reversible the bound and unbound oxygen can equilibrate. At the anode the free Co(II) complex is oxidized to Co(III) in which state it can no longer bind oxygen and thus, the oxygen is released at the anode. The cobalt(III) complex then returns to the cathode to complete the cycle.

The above described process of this invention is shown by the equations 8, 9 and 10 below:

$$1e^- + L_xCo(III)^{(n+1)+} \longrightarrow L_xCo(II)^{n+}; \quad (9)$$
(Cathode reaction)

$$O_2 + L_xCo(II)^{n+} \rightleftarrows L_xCo(II) O_2^{n+}; \text{ and} \quad (10)$$
(Cobalt(II) complex binding oxygen)

$$L_xCo(II)O_2^{n+} \longrightarrow L_xCo(III)^{(n+1)+} + 1e^- + O_2 \quad (11)$$
(Anode reaction)

When redox active transition metal complexes are used, as described above, preferably such transition metal complexes are added to the electrolyte in an amount sufficient to provide at least a 0.01 molar solution. More preferably, at least a 0.1 molar solution is provided. It is thought that if less than a 0.01 molar solution is provided the process will not be as economical as desired.

In yet another embodiment, the electrochemical cell of this invention can include mixtures of aqueous and non-aqueous electrolytes. For example, the superoxide ion is thought to have an appreciable lifetime in mixtures of acetonitrile and water. Such mixed solvents can provide stability to the superoxide ion that is comparable to the stability provided by non-aqueous solvents while eliminating the necessity to dry the inlet air. Preferably the mixture comprises at least about 1% acetonitrile by weight compared to the total weight of the electrolyte.

When mixtures of aqueous and non-aqueous electrolytes are used, such mixtures can be treated as described above for stabilizing the superoxide ion, for example by adding nitriles, Lewis acids, organic cations, certain macromolecules such as crowns and cryptands and/or ligands such as ethylenediaminetetraacetate, nitrilotriacetate, triphosphate and ethylenediamine. Further, if desired, the transition metal complexes described above can be added to the mixed electrolyte.

In addition to the above described non-aqueous electrolytes the electrolyte provided in yet another exemplary embodiment of practice of principles of this invention can be a solid polymer electrolyte. Solid polymer electrolytes useful in practice of this invention must be resistant to nucleophilic attack and oxidation, must be stable in the presence of the superoxide ion and have a low resistance to superoxide migration. Such solid polymer electrolytes contemplated for use in accordance with this invention include but are not limited to: polyvinylpyridine, polyvinylpyridine-vinylpyridinium salts, polyethyleneimine and alkylated polyethyleneimine, copolymers whose components are chosen from vinylpyridine, vinylpyridinium salts, ethyleneimine, ethylene oxide, propylene oxide, acrylonitrile, cyanoacrylates, methylmethacrylate, methyl acrylate, styrene, divinylbenzene, divinylpyridine, cumene, pyridylisopropylene and maleic anhydride.

In operation of the electrolytic cell 10 of this invention, temperatures, which are generally in the range of from about 0° to 100° C., are limited by the choice of the electrolyte.

Inlet and outlet pressures of the cell 10 may vary from a partial vacuum of about 20 torr to several atmospheres. Preferably the inlet pressure will be maintained at one atmosphere or ambient pressure and the outlet pressure will be maintained from about 5 to about 10 psi above the inlet pressure. It is understood that a higher pressure differential across the cell will normally require an increase in the applied potential. Appropriate pressure regulating systems for use on the electrochemical cell 10 of this invention are known in the art.

In accordance with practice of the invention the rate at which oxygen is separated from air or other gasous mixture can be controlled by adjusting the flow of air into the cell, the inlet and outlet cell pressure, and either the voltage across the cell or the current density. If desired the oxygen given off at the anode can be cleaned of contaminants by methods known in the art.

The following non-limiting Examples illustrate the separation of oxygen from air in accordance with the process of this invention.

EXAMPLE 1

A plexiglas electrolytic cell is divided into two compartments by means of a polyethylene frit and each such compartment is fitted with mercury electrodes. Both compartments are filled with 1 Normal (N) NaOH solution containing 1% (by weight) quinoline. A voltage of 0.5 volts is applied across the cell and a stream of air which has been depleted of $CO_2$ by bubbling it through a gas washing bottle filled with 5 molar NaOH is directed into the cathode, or negative compartment. The oxygen in the air is reduced by one electron to its superoxide ion at the cathode. The superoxide ions formed at the cathode migrate through the quinoline, which has adsorbed onto the cathode to form a coating, and thence through the NaOH solution to the anode. The superoxide ions are oxidized to oxygen at the anode and released from the anode as oxygen gas. The anode or positive compartment is protected from air, and gas evolved from the anode is collected by displacement of electrolyte in an inverted chamber or by some other means. The gas evolved at the anode is found to be substantially enriched in oxygen compared with the inlet air.

EXAMPLE 2

A glass two compartment electrolytic cell is fitted with graphite electrodes and filled with dry pyridine containing 0.1 molar tetraethylammonium chloride. Air dried by passage over anhydrous calcium sulfate and activated molecular sieves is bubbled into a first electrode compartment. A potential of 0.5 volts is applied to the electrodes with the electrode in the first compartment held negative with respect to the electrode in the second compartment. The oxygen in the air is reduced by one electron on the electrode in the first compartment (the cathode) to its superoxide ion. The superoxide ions formed at the cathode travel through the electrolyte to the electrode, i.e., the anode in the second compartment. The superoxide ions are oxidized to oxygen at the anode and released from the anode as oxygen gas. The second or anode compartment is fitted with a suitable means for collecting any gas evolved at the anode in such a manner that it is not mixed or contaminated with air. The collected gas evolved at the anode is found to be substantially enriched in oxygen compared to the air introduced into the first cathode chamber. The evolved oxygen gas is cleaned of entrained pyridine by passage over activated charcoal.

The above descriptions of preferred embodiments of an apparatus and process for separating oxygen from air are for illustrative purposes. Because of variations which will be apparent to those skilled in the art, the present invention is not intended to be limited to the particular embodiments described above. The scope of the invention is defined in the following claims.

What is claimed is:

1. A process in which an electrochemical cell is used to separate oxygen from a mixture of gases, the process comprising the steps of:
   contacting the cathode of an electrochemical cell with a gaseous mixture comprising oxygen to thereby reduce such oxygen by a single electron to its superoxide ion;
   transporting such a superoxide ion across the cell from the cathode to the anode through an electrolyte contained therein; and
   oxidizing the superoxide ion to oxygen at the anode where said oxygen is discharged as oxygen gas.

2. The process according to claim 1 wherein the electrolyte is an aqueous solution having a pH greater than 7 and the cathode has a coating thereon, the coating being relatively impermeable to water and relatively permeable to the superoxide ion.

3. The process according to claim 2 wherein the coating comprises quinoline.

4. The process according to claim 2 wherein the electrolyte contains acetonitrile.

5. The process according to claim 2 wherein the coating is a polymer.

6. The process according to claim 5 wherein the polymer is selected from the group consisting of polyvinylpyridine, polyacrylonitrile, polyacrylamide and copolymers thereof.

7. The process according to claim 2 wherein the aqueous solution has a pH greater than about 10.

8. The process according to claim 1 wherein the electrolyte is an aprotic, polar solvent containing a salt which is capable of dissolving in the solvent to provide at least a 0.1 molar solution.

9. The process according to claim 8 wherein the salt is selected from the group consisting of tetraalkylammonium salts and alkylpyridinium salts.

10. The process according to claim 1 wherein the electrolyte is a solid polymer.

11. The process according to claim 1 wherein the electrolyte contains a transition metal complex which is capable of stabilizing the superoxide ion against disproportionation.

12. The process according to claim 11 wherein the transition metal complex is a cobalt complex which is primarily in the II oxidation state at the oxygen/superoxide reversible potential.

13. The process according to claim 1 wherein the electrolyte contains a Lewis acid for stabilizing the superoxide ion against disproportionation.

14. The process according to claim 1 wherein the electrolyte contains a nitrile for stabilizing the superoxide ion against disproportionation.

15. The process according to claim 1 wherein the cathode is a gas diffusion electrode.

16. An electrochemical cell for use in separating oxygen from a mixture of gases comprising oxygen, the cell comprising:
   a cathode having a coating thereon and capable of reducing oxygen in the gaseous mixture to its superoxide ion, the coating being relatively impermeable to water and relatively permeable to superoxide ion;
   an anode at which such a superoxide ion is reoxidized to oxygen; and
   an aqueous electrolyte having a pH greater than about 7 the electrolyte providing the means for transporting such a superoxide ion across the cell from the cathode to the anode.

17. An electrochemical cell as claimed in claim 16 wherein the coating comprises quinoline.

18. An electrochemical cell as claimed in claim 16 wherein the cathode comprises mercury.

19. An electrochemical cell as claimed in claim 16 wherein the cathode comprises mercury and the coating comprises quinoline.

20. An electrochemical cell as claimed in claim 16 wherein the aqueous electrolyte has a pH greater than about 12.

21. An electrochemical cell as claimed in claim 16 wherein the coating comprises a polymer.

22. An electrochemical cell as is claimed in claim 21 wherein the polymer is selected from the group consisting of polyvinylpyridine, polyacrylonitrile, polyacrylamide and copolymers thereof.

23. An electrochemical cell as is claimed in claim 16 wherein the aqueous electrolyte contains a transition metal complex which is capable of stabilizing the superoxide ion against disproportionation.

24. An electrochemical cell as claimed in claim 16 wherein the electrolyte contains a Lewis acid for stabilizing the superoxide ion against disproportionation.

25. An electrochemical cell as claimed in claim 16 wherein the electrolyte contains a nitrile for stabilizing the superoxide ion against disproportionation.

26. An electrochemical cell for use in separating oxygen from a mixture of gases comprising oxygen, the cell comprising:
   a cathode capable of reducing oxygen in the gaseous mixture to its superoxide ion;
   an anode at which such superoxide ions are reoxidized to oxygen; and
   an electrolyte comprising an aprotic solvent containing a dissolved salt, the electrolyte providing the means for transporting such a superoxide ion across the cell from the cathode to the anode.

27. An electrochemical cell as claimed in claim 26 wherein the salt is selected from the group consisting of tetraalkylammonium salts and alkylpyridinium salts.

28. An electrochemical cell as claimed in claim 26 wherein the dissolved salt forms at least a 0.1 molar solution with the aprotic solvent.

29. An electrochemical cell for use in separating oxygen from a mixture of gases comprising oxygen, the cell comprising:

a cathode capable of reducing oxygen in the gaseous mixture to its superoxide ion:

an anode at which such a superoxide ion is reoxidized to oxygen; and a solid polymer electrolyte, the polymer electrolyte providing the means for transporting such a superoxide ion across the cell from the cathode to the anode.

30. A process in which an electrochemical cell is used to separate oxygen from a mixture of gases, the process comprising the steps of:

adding a transition metal complex to the electrolyte contained in the cell, such a transition metal complex capable of being reduced at a potential more positive than oxygen reduction;

providing a potential across the cell to reduce the transition metal complex at the cathode to form a complex capable of reversibly binding oxygen;

introducing a gaseous mixture comprising oxygen into the electrochemical cell to contact the reduced transition metal complex so that oxygen is bound to said complex; and transporting the oxygen-containing complex to the anode where the complex is reoxidized at which time said complex releases the bound oxygen for recovery.

31. A process in which an electrochemical cell is used to separate oxygen from a mixture of gases, the process comprising the steps of:

adding a transition metal complex of the formula $L_xCo(III)^{(n-1)+}$ to the electrolyte of the electrochemical cell, where L designates a ligand, x designates the number of such ligands associated with the Co ion, III represents the Co ion valence and n is the total charge of the complex, the ligand selected to provide that Co(III) is reduced to Co(II) at potentials more positive than oxygen reduction;

providing a potential across the cell to thereby reduce the Co(III) to Co(II) at the cathode to provide a complex of the formula $L_xCo(II)^{n+}$;

introducing a gaseous mixture comprising oxygen into the electrochemical cell to contact the $L_xCo(II)^{n+}$ complex so that such oxygen is bound to the complex; and transporting the oxygen containing complex to the anode where the Co(II) comprising the complex is oxidized to Co(III), at which time the complex releases the bound oxygen for recovery.

* * * * *